Jan. 24, 1928.
O. M. BULLOCK
1,657,064
CULTIVATOR
Original Filed April 18, 1922
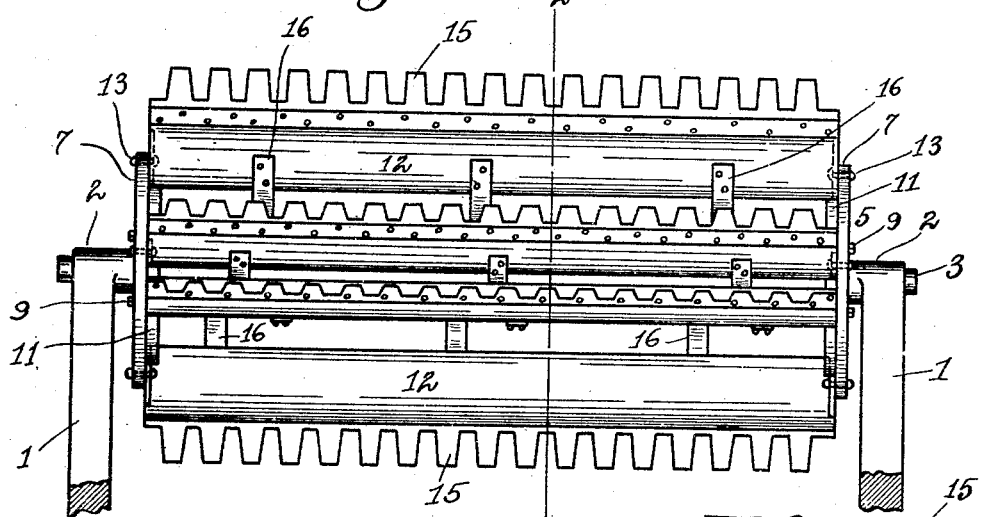
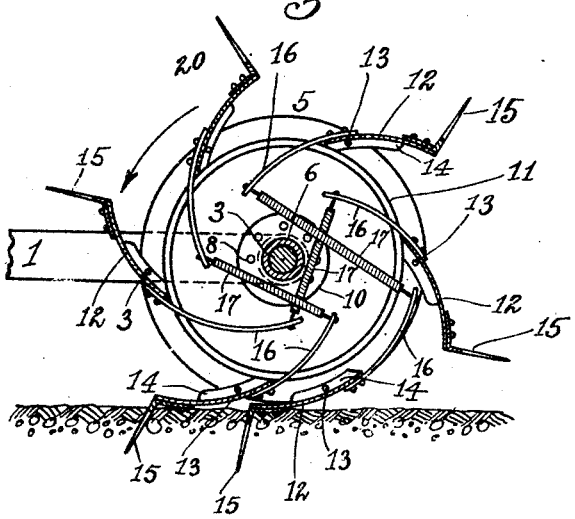
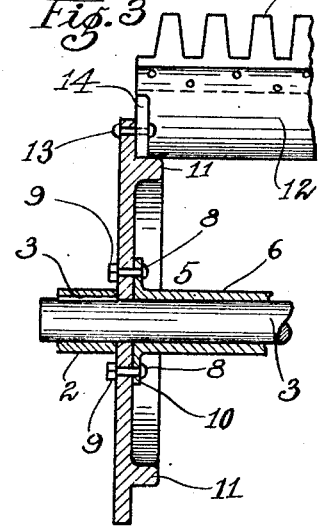
Inventor
ORIN M. BULLOCK
By Harry C Schroeder
Attorney Patented Jan. 24, 1928.

1,657,064

UNITED STATES PATENT OFFICE.

ORIN M. BULLOCK, OF OAKLAND, CALIFORNIA.

CULTIVATOR.

REISSUED

Application filed April 18, 1922, Serial No. 554,766. Renewed July 13, 1927.

My invention is an improved cultivator constructed with spring actuated blades which are sprung out of the ground with a shovel action whereby the soil is thoroughly broken up and finely cultivated.

In its broad aspect my invention is an improved method and appliance for cultivating soil in which a heavy body is rolled over the ground and by its own weight, or an additional force having a downward component, drives or forces blades into the soil against an energy storing medium: and on continued rolling of the body the stored energy is used to actuate the blades to loosen, turn, lift or otherwise cultivate the soil. The blades are mounted on a suitable body, which may be rolled, are connected thereto to project in advance of the body, contact with the soil in advance thereof, by the weight of the body be forced into the soil and at the same time cause a storage of energy, which on the further rolling of the body is released to pull the blades through the soil and give them a lifting action to the rear of the body, the blades being substantially at rest, in relation to the soil, when directly underneath the main part of the rolling body.

In the specific embodiment of my invention the appliance comprises, preferably, a reel or drum having arms pivoted thereto with blades at the ends and springs to absorb the energy of forcing the blades into the soil and give it out as they lift on further rolling of the reel or drum along the ground. The springs may be made sufficiently stiff so the reel or drum does not contact with the ground but rides on the blades and arms. My method of cultivating comprises, in brief, moving a series of blades into contact with the soil, forcing them into the soil and at the same time storing up the energy required to force them in, allowing the blades to remain substantially stationary while their supporting body is moved past the blades and in lifting the blades out of the soil utilizing the stored up energy to cultivate the soil by actuating the blades. The method may be performed without any additional force being applied to the blades than that required to roll the supporting body over the ground.

My invention is not to be confused, as to method and appliance, with cultivators which have resilent or resiliently-mounted blades on reels or drums that are positively rotated, dragging the blades through the soil, whether these are pulled along the ground and rotate in the direction of travel, the reverse thereto or crosswise.

Referring to the annexed drawing in which my invention is illustrated and which forms a part of this specification:

Figure 1 is a plan view of my cultivator with the front portion of the frame thereof broken away.

Figure 2 is a transverse vertical section of my cultivator taken on line 2—2 of Figure 1.

Figure 3 is a fragmentary longitudinal section through one end of my cultivator.

In the drawing 1 indicates a frame on the rear end of which are sleeves 2—2 in which are keyed the ends of a transverse shaft 3 by means of keys 4. On the shaft 3 between the bearings 2—2 is journaled a reel 5 comprising a sleeve 6 surrounding said shaft and disk heads 7—7 secured to the ends of said sleeve by bolts 8 and nuts 9, which bolts extend through annular flanges 10—10 on the ends of said sleeve and through said heads. The heads 7—7 are formed in their inner sides near their peripheries with annular flanges 11—11. Arcuate blade levers 12, preferably six in number are pivoted at their ends outside the flanges 11—11 with their convex sides outward to the inside of the heads 7—7 by pivots 13—13 which extend through said heads near their peripheries and through inturned flanges 14—14 on the ends of said levers, the inner ends of said levers and flanges 14—14 being adapted to engage the flanges 11—11 to limit the outward movement of the levers. Comb-toothed blades 15 are secured to the outer ends of the levers 12 respectively, said blades extending outwardly and radially from said levers. Inwardly extending arms 16 preferably three in number are secured to the inner edge of each blade lever 12 at suitable distances apart. Springs 17 respectively connect the arms 16 of each blade lever 12 to the corresponding arms 16 of another blade lever, which springs normally tend to hold the levers and their blades 15 in their outermost position, but yield to allow the blades and levers to swing inwardly when they engage the ground as shown in Figure 2.

As the reel 5 rotates in the direction of arrow 20 (Fig. 2), the blades 15 engaging the soil swing inwardly on their pivots and expand their springs 17 so that as the reel continues to rotate and begins to withdraw said blades from the soil said springs contract and throw said blades outwardly at the rear out of the soil with a shovel action, thus thoroughly digging and breaking up the soil and finely cultivating the same. It will be evident that in the operation of the machine, energy is stored in each spring whenever one of the lever arms to which it is attached passes under the reel, that the blades are substantially stationary in the soil directly under the shaft 3 and that it is practically only the released energy of the spring which turns or cultivates the soil.

It will be obvious that my appliance may be varied considerably to suit special circumstances, that it could be attached to tractor wheels, the track of a caterpillar tractor or made with stiff springs so that the reel would not touch the ground.

In some of the claims the designation "resilient means or springs operatively connecting the arms and the body" is used. It will be observed that each of the arms 16 by the spring, the pivotal connection of the opposite arm and the stop is operatively connected from the arm to the body. A spring from each arm could be connected directly to the body or reel, but this would necessitate double the number of springs.

Having described my invention, I claim:

1. In an agricultural implement a frame, a reel journaled on said frame, a plurality of blade levers pivotally mounted on the reel, said levers on the portion outside the reel being curved substantially similar to the periphery of the reel, blades secured on the outer end of said levers, arms extending from the inner edges of the levers, and springs connecting the arms of each lever with corresponding arms of another lever for normally holding said levers and their plates swung outwardly from said reel.

2. In an agricultural implement, a frame, a reel journaled on said frame, a plurality of blade levers pivotally mounted on said reel, blades secured on the outer ends of said levers, arms extending from the inner edges of said levers, and springs connecting the arms of each lever with corresponding arms of another lever for normally holding said levers and their blades swung outwardly from said reel.

3. In an agricultural implement, a frame, a reel journaled on said frame, annular flanges on the inside of the heads of said reel, levers pivoted to said heads, blades on the outer ends of said levers, and springs for normally holding said levers and their blades swung outwardly from said reel, the inner edges of said levers engaging said flanges to limit their outward movement.

4. In an agricultural implement, a frame, a revolvable member journaled on said frame, a plurality of levers mounted on said revolvable member, blades on said levers, and a single yielding means for normally holding a plurality of said levers and their blades swung outwardly from the revolvable member.

5. A cultivator comprising a reel adapted to roll over the ground, a pair of arcuate levers pivoted to said reel, a tension spring connecting the inner ends of said levers, and a radial blade carried by each of said levers.

In testimony whereof I affix my signature.

ORIN M. BULLOCK.